United States Patent
Hodges et al.

(10) Patent No.: US 9,711,980 B2
(45) Date of Patent: Jul. 18, 2017

(54) CHARGING DEVICE FOR REMOVABLE INPUT MODULES

(71) Applicant: Microsoft Technology Licensing, LLC, Redmond, WA (US)

(72) Inventors: Stephen E Hodges, Cambridge (GB); Stuart Taylor, Cambridge (GB); John Franciscus Marie Helmes, Steyl (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 14/553,819

(22) Filed: Nov. 25, 2014

(65) Prior Publication Data

US 2016/0149426 A1    May 26, 2016

(51) Int. Cl.
| | |
|---|---|
| *H02J 7/00* | (2006.01) |
| *H02J 7/02* | (2016.01) |
| *G06F 1/16* | (2006.01) |
| *G06F 1/26* | (2006.01) |
| *H02J 50/10* | (2016.01) |
| *H02J 50/80* | (2016.01) |

(52) U.S. Cl.
CPC .......... *H02J 7/0042* (2013.01); *G06F 1/1632* (2013.01); *G06F 1/266* (2013.01); *H02J 7/0027* (2013.01); *H02J 7/025* (2013.01); *H02J 50/10* (2016.02); *H02J 50/80* (2016.02)

(58) Field of Classification Search
CPC ........ H02J 7/025; H01F 38/14; Y02T 90/122; B60L 11/182; Y02E 60/12
USPC ........................................................ 320/108
See application file for complete search history.

(56) References Cited

U.S. PATENT DOCUMENTS

| | | | |
|---|---|---|---|
| 4,459,578 A | | 7/1984 | Sava et al. |
| 6,034,505 A | * | 3/2000 | Arthur ................ H01M 2/1022 320/113 |
| 6,530,838 B2 | | 3/2003 | Ha et al. |
| 7,580,728 B2 | | 8/2009 | Vance et al. |
| 7,653,771 B2 | | 1/2010 | Liberty |
| 7,833,097 B1 | | 11/2010 | Maddox et al. |
| 8,417,296 B2 | | 4/2013 | Caballero et al. |
| 8,529,357 B2 | | 9/2013 | Joynes et al. |
| 8,634,873 B2 | | 1/2014 | Jones et al. |

(Continued)

FOREIGN PATENT DOCUMENTS

| | | |
|---|---|---|
| CN | 202237223 U | 5/2012 |
| CN | 202860081 U | 4/2013 |

(Continued)

OTHER PUBLICATIONS

PCT Search Report and Written Opinion mailed Jan. 18, 2016 for PCT application No. PCT/US2015/061721, 13 pages.

(Continued)

*Primary Examiner* — Arun Williams
(74) *Attorney, Agent, or Firm* — Lee & Hayes, PLLC

(57) ABSTRACT

A charging device for one or more input modules for a touch-screen device is described. The charging device comprises a charging mechanism and portions which are shaped to receive an input module. The charging mechanism comprises a power input and a power output. The power input is configured to receive power from an external power source and the power input is configured to provide power to one or more input modules which are attached to the charging device.

20 Claims, 8 Drawing Sheets

(56) References Cited

U.S. PATENT DOCUMENTS

| | | | |
|---|---|---|---|
| 8,858,335 | B2 | 10/2014 | Helmes et al. |
| 2006/0244419 | A1* | 11/2006 | Palmquist ............. G06F 1/1632 320/114 |
| 2006/0252537 | A1 | 11/2006 | Wu |
| 2009/0033522 | A1 | 2/2009 | Skillman et al. |
| 2009/0305748 | A1* | 12/2009 | Piekarz ............... B60R 11/0241 455/573 |
| 2010/0079106 | A1 | 4/2010 | Graham |
| 2011/0098116 | A1 | 4/2011 | Liu |
| 2011/0115430 | A1* | 5/2011 | Saunamaki ............. H02J 5/005 320/108 |
| 2011/0260969 | A1 | 10/2011 | Workman |
| 2011/0266997 | A1* | 11/2011 | Krancher ............. H02J 7/0044 320/107 |
| 2012/0223819 | A1* | 9/2012 | Burgess ............... H04B 5/0031 340/10.42 |
| 2013/0005401 | A1 | 1/2013 | Rosenhan et al. |
| 2013/0052956 | A1 | 2/2013 | Mckell |
| 2013/0095925 | A1 | 4/2013 | Xu |
| 2013/0184077 | A1 | 7/2013 | Galpern |
| 2014/0206451 | A1 | 7/2014 | Helmes et al. |
| 2014/0247246 | A1 | 9/2014 | Maus |

FOREIGN PATENT DOCUMENTS

| | | |
|---|---|---|
| CN | 203342350 U | 12/2013 |
| CN | 203355266 U | 12/2013 |
| CN | 103631394 A | 3/2014 |
| CN | 103721415 A | 4/2014 |
| DE | 10240066 A1 | 4/2003 |

OTHER PUBLICATIONS

"Wish List—Hardware", Published on: Apr. 6, 2011, Available at: http://wiki.openmoko.org/wiki/Wish_List_-_Hardware.

Cummings, Corey, "Drone Controller Turns Your Smartphone into a Console", Published on: Mar. 31, 2012, Available at: http://techli.com/2012/03/drone-controller/.

"Sixaxis Controller App—Use your PS3 Controller to Play Android Games", Aug. 9, 2012, Available at: http://www.techgadgetsnews.com/sixaxis-controller-app-use-your-ps3-controller-to-play-android-games/.

Newman, Jared, "Smartphones and Tablets Get their Gaming Buttons", Published on: Jan. 8, 2012, Available at: http://technologizer.com/2012/01/08/smartphones-and-tablets-get-their-gaming-buttons/.

Glenn, "Nvidia and Nyko Will Offer PlayPad Controllers to Tegra-Based Devices", Published on: Jun. 7, 2012, Available at: http://thedroidguy.com/2012/06/nvidia-and-nyko-will-offer-playpad-controllers-to-tegra-based-devices/.

Moore, Nick, "The Powera MOGA Brings Console-Like Game Controls to Android Phones", Published on: Jun. 3, 2012, Available at: http://www.gizmag.com/powera-moga/22794/.

Fingas, John, "FlipSide case for iPhone packs stealthy game controls, plays on solar power", Published on: Dec. 23, 2012, Available at: http://www.engadget.com/2012/12/23/flipside-case-for-iphone-packs-stealthy-game-controls/.

Perry, Douglas, "PowerA's MoGa Turns Phones Into PS Vita and DS Rivals", Published on: Jun. 26, 2012, Available at: http://www.tomsguide.com/us/powera-moga-controller-android-gaming,news-15509.html.

Hatfield, Don, "Gametel Game Controller Now Supports iPhone and iPad", Published on: Jun. 1, 2012, Available at: http://multiplayerblog.mtv.com/2012/01/06/gametel-game-controller-now-supports-iphone-and-ipad/.

Evans, Joe, "Mad Catz MIDI PRO-Adapter", Published on: Jan. 12, 2011, Available at: http://www.legitreviews.com/article/1523/1/.

Lee, Cody, "Introducing Bladepad, the detachable iPhone gamepad", Published on: Aug. 6, 2012, Available at: http://www.idownloadblog.com/2012/08/06/detachable-iphone-gamepad/ www.pcgerms.com, "GameKlip: Fusion of Android smartphones and PS3", Published on: Aug. 7, 2012, Available at: http://www.pcgerms.com/gameklip-fusion-of-android-smartphones-and-ps3-controllers/.

www.myandroidgadgets.com, "Play your Android games in style; Check out this homemade PS3 controller Samsung Galaxy Nexus dock", Published on: Aug. 24, 2012, Available at: http://myandroidgadgets.com/play-your-android-games-in-style-check-out-this-homemade-ps3-controller-samsung-galaxy-nexus-dock/.

Kuchera, Ben, "Mad Catz releases the MLG console controller: for $100 you can have it your way", Published on: Jan. 11, 2012, Available at: http://arstechnica.com/gaming/2012/01/mad-catz-offers-the-mlg-console-controller-for-100-you-can-have-it-your-way/.

TechnicalMarkus, "Ice Cream Sandwich lets you use game controllers on your Android phone", Published on: Oct. 25, 2011, Available at: http://www.mobileshop.com/blog/mobile-phone-blogs/ice-cream-sandwich-lets-you-use-game-controllers-on-your-android-phone/.

Alibaba.com, "Mobile Gaming controller", Published on: date unknown (not later than Aug. 2012), Available at: http://www.alibaba.com/product-gs/453473204/Mobile_Gaming_controller.html.

Willington, Ray, "Wikipad Gaming Tablet Coming With Android 4.0, Controller Add-On", Published on: May 4, 2012, Available at: http://hothardware.com/News/Wikipad-Gaming-Tablet-Coming-With-Android-40-Controller-AddOn/.

blu-max.com, "Bluetooth Stereo Headset—Blumax Clip", Published on: Apr. 12, 2012, Available at: http://blu-max.com/products/bluetooth_headset_clip.html.

"Gametel", Sep. 17, 2014 Available at: http://www.gametel.se/.

Gorman, Michael, "Gametel Bluetooth Mobile Controller", Published on: Aug. 30, 2012 Available at: http://www.gametel.se/.

"MOGA Ace Power", Sep. 17, 2014 Available at: http://www.mogaanywhere.com/ace/.

"MOGA Pocket Controller", Sep. 17, 2014 Available at: http://store.mogaanywhere.com/Products/CPFA000253-01.

"NVidia Shield", Sep. 17, 2014 Available at: http://shield.nvidia.com/.

"Razer Junglecat—Mobile Game Controller for the iPhone", Sep. 17, 2014 Available at: http://www.razerzone.com/gaming-controllers/razer-junglecat.

"Steelseries Stratus Wireless Gaming Controller", Sep. 17, 2014 Available at: http://steelseries.com/us/products/controllers/steelseries-stratus-wireless-gaming-controller.

"SMACON", Sep. 17, 2014 Available at: http://www.sma-con.com/en/.

"Ion iCade", Sep. 17, 2014 Available at: http://www.ionaudio.com/products/details/icade.

"Samsung Smartphone GamePad", Sep. 17, 2014 Available at: http://www.samsung.com/uk/consumer/mobile-devices/smartphones/smartphone-accessories/EI-GP20HNBEGWW.

"Range of iPega Controllers", Sep. 17, 2014 Available at: http://www.amazon.co.uk/s/?ie=UTF8&keywords=ipega+controller&tag=mh0a9-21&index=aps&hvadid=3170930385&ref=pd_sl_8cqpt3usal_ee.

"Bluetooth Game Controller, The Dronel", Sep. 17, 2014 Available at: http://www.roms4droid.com/index.php/bluetooth-game-controller-the-drone/.

"GameVice", Sep. 17, 2014 Available at: http://www.gamevice.com/.

"Phonejoy", Sep. 17, 2014 Available at: http://phonejoy.com/.

Lefebvre, Rob, "First Two iOS 7 Game Controllers Teased By Logitech, ClamCase", Published on: Sep. 19, 2013 Available at: http://www.cultofmac.com/246399/first-two-ios-7-game-controllers-teased-by-logitech-clamcase/.

Tyson, Mark, "GameKlip Clips a PS3 Controller to your Android Phone", Published on: Aug. 7, 2012 Available at: http://hexus.net/gaming/news/android/43409-gameklip-clips-ps3-controller-android-phone/.

(56) References Cited

OTHER PUBLICATIONS

Davidson, Andrew, "XOPAD Open Source Android USB Controller gets into the Game", Published on: Feb. 5, 2013 Available at: http://www.gizmag.com/xopad-open-source-usb-game-controller-android/26095/.

Ayeleasebee, "iFrogz to unveil $70 Caliber Advantage mobile gaming controller; Belkin to display new $80 and $50 iPad keyboard cases", Published on: Jan. 8, 2013 Available at: http://9to5mac.com/2013/01/08/ifrogz-to-unveil-70-caliber-advantage-mobile-gaming-controller-belkin-to-display-new-80-and-50-ipad-keyboard-cases/.

Reid, Ben, "This Gaming Controller for the iPad mini, Nexus 7 Looks Stunning [Video]", Published on: Apr. 12, 2013 Available at: http://www.redmondpie.com/game-d-controller-for-ipad-mini-and-nexus-7-video/.

"Pocket Gamer: Video Game Controller for iPhone", Sep. 9, 2014 Available at: https://www.kickstarter.com/projects/1685918106/pocket-gamer.

Thukral, Hitesh, "WikiPad first glasses-free 3D Android tablet with attachable game controller", Sep. 9, 2014 Available at: http://techwrldinfo.blogspot.in/2012/01/wikipad-first-glasses-free-3d-android.html.

"DUALSHOCK® 3 Wireless Controller", Published on: Nov. 22, 2010 Available at: http://us.playstation.com/ps3/accessories/dualshock-3-wireless-controller-ps3.html.

"Psyclone TouchCharge Kit Review: Wireless Charging Comes to Game Controllers", Published on: Oct. 1, 2009 Available at: http://www.popularmechanics.com/technology/gadgets/4294717.

"Gamepad", Published on: Sep. 17, 2012 Available at: https://www.scirra.com/manual/143/gamepad.

"PG-9023 wireless bluetooth game controller for mobile phone tablet PC", Sep. 13, 2014 Available at: http://www.alibaba.com/product-detail/PG-9023-wireless-bluetooth-game-controller_2006404292.html.

"PlayStation 3 Wireless Sixaxis Controller", Published on: Nov. 17, 2006 Available at: http://www.amazon.com/PlayStation-3-Wireless-Sixaxis-Controller/dp/B000K1CS5Y.

Lee, Cody, "Wikipad introduces new 'Gamevice' controller for iPad mini", Published on: Jun. 18, 2014 Available at: http://www.idownloadblog.com/2014/06/18/wikipad-gamevice-ipad-mini/.

Yu, et al., "Clip-on Gadgets: Expanding Multi-touch Interaction Area with Unpowered Tactile Controls", In Proceedings of the 24th annual ACM symposium on User interface software and technology, Oct. 16, 2011, 5 pages.

"Charging without Wires", Published on: May 13, 2012 Available at: http://batteryuniversity.com/learn/article/charging_without_wires.

Hwang, et al., "MagGetz: Customizable Passive Tangible Controllers on and Around Conventional Mobile Devices", UIST'13, Oct. 8-11, 2013.

Liang, et al., "GaussBricks: Magnetic Building Blocks for Constructive Tangible Interactions on Portable Displays", CHI 2014, Apr. 26-May 1, 2014.

"Second Written Opinion Issued in PCT Application No. PCT/US2015/061721," Mailed Date: Sep. 6, 2016, pp. 7.

"International Preliminary Report on Patentability Issued in PCT Application No. PCT/US2015/061721," Mailed Date: Nov. 30, 2016, 8 Pages.

\* cited by examiner

CHARGING DEVICE FOR REMOVABLE INPUT MODULES

BACKGROUND

There are large numbers of computing devices that have touch-sensitive screens which allow users to interact using touch gestures directly on the device's screen. Examples include smartphones, tablet computers, large interactive surface computers and touch-sensitive displays for desktop computers. In some applications, this interface provides an adequate user input mechanism.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A charging device for one or more input modules for a touch-screen device is described. The charging device comprises a charging mechanism and portions which are shaped to receive an input module. The charging mechanism comprises a power input and a power output. The power input is configured to receive power from an external power source and the power output is configured to provide power to one or more input modules which are attached to the charging device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

There are many devices which comprise a flat, continuous interaction surface (a touch-sensitive screen), including mobile/handheld devices (e.g. smartphones, tablet computers, portable games consoles) and larger, non-portable devices (e.g. surface computing devices and touch-sensitive displays for desktop computers). These devices are referred to herein as 'touch-screen devices'. The lack of physical reference points, boundaries or tactile feedback provided by the touch-sensitive screen (unlike with physical buttons) can cause problems for some applications (e.g. games) and for some users (e.g. those with a visual impairment). It is easy for a user's fingers to move when playing a game so that the fingers are no longer aligned with the game's input controls and this is exacerbated where the game requires rapid or frequent input. Additionally, when in position, the user's fingers may obscure areas of the screen and this may impact usability, particularly for smaller form factor devices (e.g. smartphones). Furthermore, it may be difficult for an application developer to arrange all the requisite input controls on the touch-sensitive screen in a layout which is comfortable for a user when using the application for a prolonged period (e.g. half an hour or more), i.e. it may be difficult to provide an ergonomic arrangement of input controls on a flat interaction surface.

The embodiments described below are not limited to implementations which solve any or all of the disadvantages of known user input devices.

Figure 1:
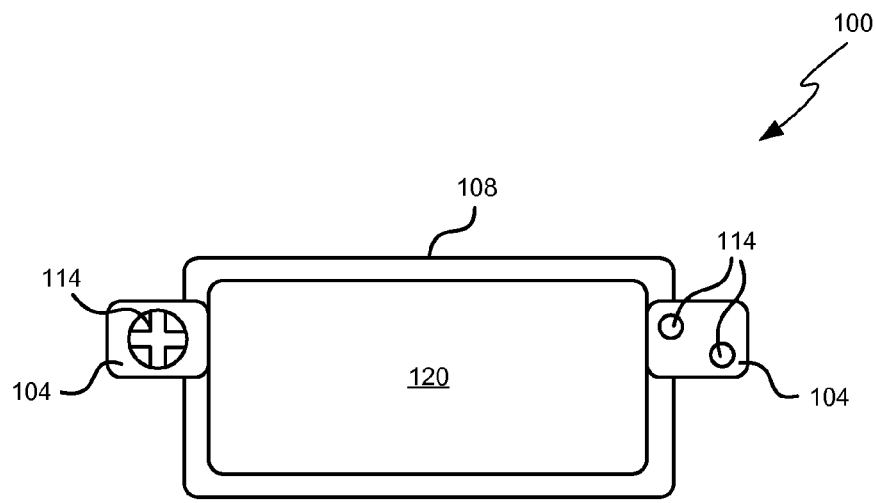
FIG. 1 is a schematic diagram of a system which comprises two removable input modules which can be temporarily attached to a touch-screen device and which provide input controls.
Figure 1:
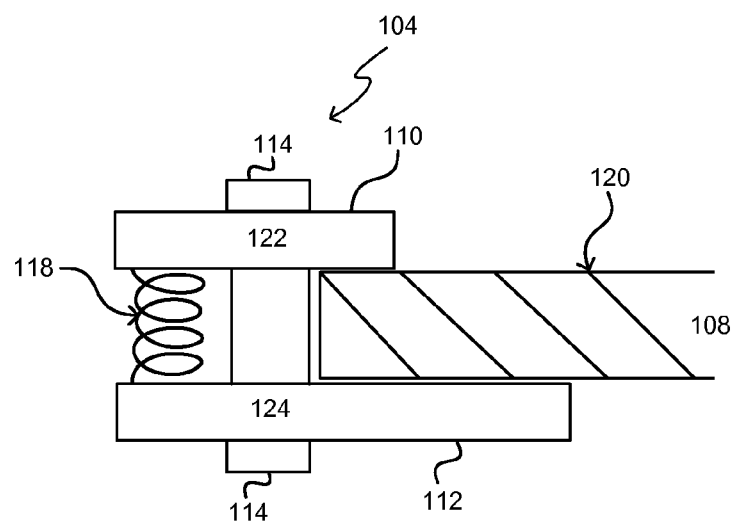

FIG. 1 is a schematic diagram of a system 100 which comprises two removable input modules 104 which can be temporarily attached to a touch-screen device 108 and which provide input controls 114. As shown in FIG. 1, the input modules 104 are temporarily attached around a periphery of the touch-screen device 108 such that they obscure very little or none of the display area 120. Where the touch-screen device 108 is a touch-screen computing device (e.g. a smartphone, tablet computer, etc.), the inputs are mapped to software running on the touch-screen computing device and where the touch-screen device is a peripheral (i.e. a touch-screen peripheral device) for a computing device (e.g. a touch-sensitive display for a desktop computer), the inputs are mapped to software running on that computing device. Each input module 108 communicates with the computing device either directly or via the other input module and this communication uses a wire-free communication element (using, for example, wireless technologies, light, sound, etc.) within each input module 104. Subsequently (e.g. when the user has finished interacting with the touch-screen device or when the module is not needed), the module 104 can be detached from the touch-screen device 108 and stored until it is next used by the user (e.g. connected to the same touch-screen device or a different touch-screen device).

Examples of touch-screen computing devices include mobile/handheld devices (e.g. smartphones, tablet computers, portable games consoles) and larger, non-portable devices (e.g. large form-factor tablet computers, surface computing devices, a touch-sensitive device integrated into an appliance or vehicle, touch-sensitive televisions). Examples of touch-screen peripheral devices include touch-sensitive displays for desktop computers. While many of the following examples refer to a touch-screen computing device, this is by way of example. The examples may also be applied to a touch-screen peripheral device, in which case any data communication is between the input module and the computing device to which the touch-screen peripheral device is connected.

The input modules 104 can be placed anywhere around the periphery of the touch-screen device 108 and may be rearranged by a user depending on the application displayed/running on the device, personal preference, or any other factor. Consequently, the modules may be described as reconfigurable (e.g. a user can choose where to place the modules and can move them if they wish). Although the example in FIG. 1 shows use of two modules, in other examples, a single module may be used or any other number of modules may be used by one or more concurrent users of the touch-screen device.

Each input module 104 comprises an input control 114 which may, for example, be a tactile input control, such as a physical control (e.g. one with a contoured profile which may move when pressure is applied by a user) which provides tactile feedback to a user that their finger/thumb is correctly positioned on the control (e.g. through the shape of the control or by using a vibrotactile control). In other examples, the input control may not be tactile and instead may comprise an optical sensor, capacitive sensor or other sensor. In further examples, a combination of tactile and non-tactile input controls may be provided. It will be appreciated that the examples shown in FIG. 1 (a four-way control and a pair of buttons) are just examples of the input controls that may be provided on an input module. Further examples include, but are not limited to, a rotary knob, a slider, a single button (or different number of buttons), a switch and a small joystick. Examples of sensors which may be used include, but are not limited to, a hover sensor for hand position (e.g. based on reflecting IR or seeing IR shadows or thermal IR sensing or based on ultrasound), a magnetometer for sensing distortions due to rings worn on hands, or any other type of sensor that can detect a characteristic of the human (e.g. a galvanic skin response sensor or heart rate sensor) or a characteristic of something the human is wearing. If the device (e.g. the touch-screen device or the module) is flexible or articulatable, then the sensors may detect how the user flexes or articulates the device, e.g. using accelerometer.

Each input control 114 is mapped to a user input of an application or other program (e.g. the operating system or any other software) displayed/running on the touch-screen device 108. The user inputs to which an input control 114 is mapped may be a touch-event (i.e. a user input that a user would usually provide by touching the touch-sensitive display) or may be an input via a physical button or control on the touch-screen device 108 or any input via a supported peripheral (e.g. a Bluetooth keyboard) or any other supported hardware (where the hardware need not be present but only be supported by the program receiving the user input). In some examples, the user inputs may be keystrokes such that the input/output modules may be used instead of an onscreen keyboard.

Where there are multiple input controls, as in the examples shown in FIG. 1, each input control may be mapped to a different user input of the same application/program or the input controls may be mapped to user inputs of two or more applications/programs. In an example, both the four-way control and buttons may be mapped to user inputs of a game which is displayed or running on the touch-screen device. In another example, the four-way control may be mapped to a user input of a game running on the touch-screen device 108 (or a cloud-based game which is displayed on the touch-screen device) and the buttons may be mapped to functions within the operating system (OS) of the device, such as volume controls. In a further example, the four-way control may be mapped to a user input of an application displayed/running on the touch-screen device 108 and one of the buttons may be mapped to a particular input in another application (e.g. an 'answer' button in an IP telephony application). The mapping may be fixed, dynamic or a combination of both fixed and dynamic (e.g. with a first subset of controls having a fixed mapping and a second subset of controls being dynamically mapped, where each subset does not comprise all of the controls). There may be a number of factors which influence the mapping and these may include the position of an input/output module, the relative position of more than one input/output module, the particular application (or other program) which is visible on the screen (or uppermost, where multiple applications are visible), user input, etc.

FIG. 1 also shows a cross section through an input module 104 when connected to a touch-screen device 108 and from this it can be seen that the input controls may be on the front face 110 (i.e. the side which is visible when viewing the display 120 on the touch-screen device 108) and/or the rear face 112 of the input module 104. In addition (or instead) controls may be provided on other faces of the input module 104 (e.g. on the sides or corners). The input module 104 also comprises an attachment mechanism 118 (shown as spring by way of example) which attaches the input module 104 to the touch-screen device 108 and in various examples the attachment mechanism provides a clamping force which grips the touch-screen device between the upper and lower members 122,124 of the input module 104. In various examples, one or more of the modules 104 may also comprise an output device such as a visual indicator (e.g. a small display or one or more LEDs), audible indicator (e.g. a small speaker or buzzer or headphone socket), tactile (or haptic) feedback device (e.g. a vibration mechanism, any physical movement actuator or a movement retarder if the touch-screen device or module is flexible or articulatable) or other sensory feedback device (e.g. a heating/cooling device, such as a Peltier cooler, which can provide feedback by changing the temperature of a module or chemical outputs for smells, hormones, etc.).

It will be appreciated that FIG. 1 is not necessarily drawn to scale, however, in various examples the modules are compact and have dimensions which are considerably smaller than the touch-screen device 108 to which they attach. For example, the front face of the modules may be approximately 1 inch (2.54 cm) square and used with touch-screen displays ranging from around 3 inches (~7.5 cm) to 10 inches (~25 cm) or more (where the screen size is measured on the diagonal). Although FIG. 1 shows all the modules being approximately the same shape and size, in some examples, the modules within a set may be of different sizes and/or shapes.

Figure 2:
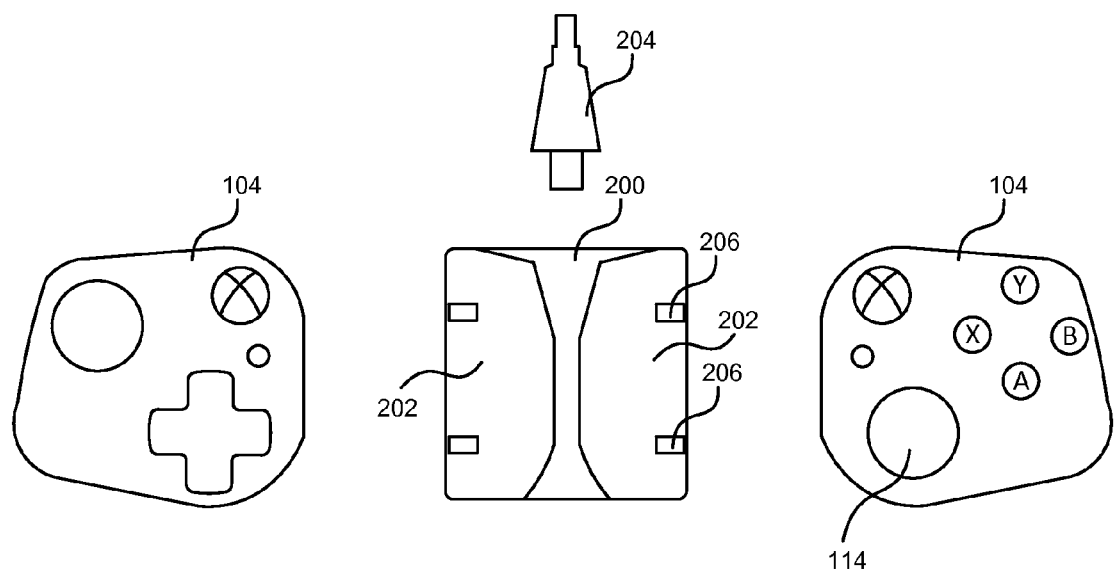
FIG. 2 shows schematic diagrams of a charging device for one or more removable input modules with and without the input modules in place.
Figure 2:
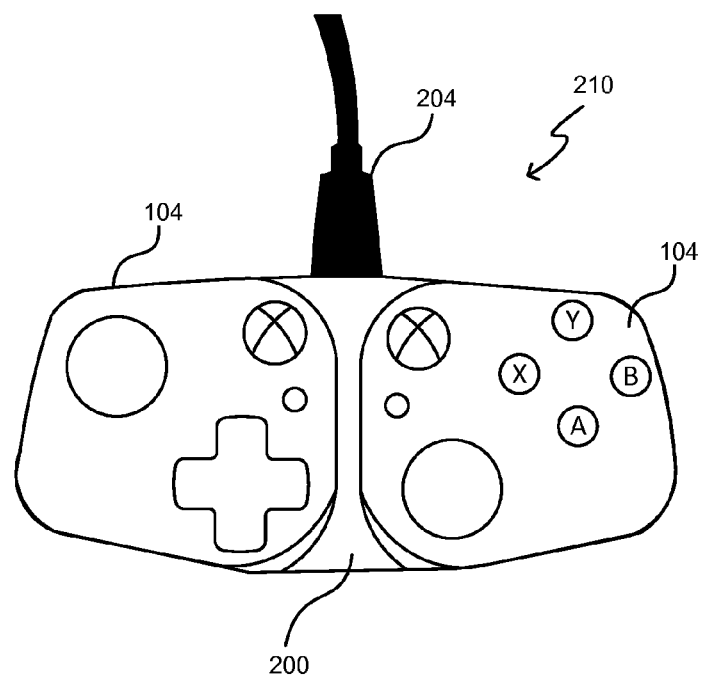

The input modules 104 shown in FIG. 1 are powered by a rechargeable power source (e.g. battery, super capacitor or fuel cell) within the input module. FIG. 2 shows schematic diagrams of a charging device 200 for one or more removable input modules 104 with and without the input modules in place. The charging device 200 shown in FIG. 2 comprises two attachment portions 202, each of which is configured (e.g. shaped) to receive an input module 104; however in other examples, a charging device may comprise a single attachment portion or more than two attachment portions (i.e. to receive more than two input modules). The charging device 200 also comprises a charging mechanism (or arrangement) for charging the input modules 104.

The charging mechanism comprises a power input which in the example shown in FIG. 2 is a socket to receive a wired power connector 204 (e.g. a micro-USB socket). In other examples, the power input may instead receive power in another way (e.g. it may comprise a coil which receives power through inductive transfer from a primary coil in another device, it may comprise a photovoltaic cell, etc.). The charging mechanism also comprises a power output which provides power to one or more of the removable input modules 104 and in the example shown in FIG. 2 the power output comprises two metallic contacts 206 for each input module 104, although in other examples three contacts may be provided (e.g. such that the input modules 104 can be attached either way round to the charging device 200 with an input module connecting to the center contact and one of the outer contacts) or a different number of contacts may be provided. In various examples (as in FIG. 2) the metallic contacts 206 may be provided on the attachment portions 202. The metallic contacts 206 may be leaf spring contacts, spring-loaded pins (also referred to as pogo pins) or other spring-loaded contacts. In other examples, the power input may instead transfer power to the input modules 104 in another way (e.g. it may comprise a coil which transfers power through inductive transfer to secondary coils in the input modules).

Where the power output comprises metallic contacts 206 (as in FIG. 2), corresponding metallic contacts are provided on the input modules 104. The corresponding metallic contacts on the input modules are positioned such that they align with the metallic contacts 206 on the charging device 200 when the input module is attached to the charging device. The corresponding metallic contacts on the input modules are not visible in the diagrams shown in FIG. 2 but may be positioned on the inner faces of the front and/or rear members 122, 124 of an input module 104 (i.e. on one or both of the faces which contact the touch-screen device 108). In order that the metallic contacts on the input modules 104 do not contact with the touch-screen device 108 (which may scratch or otherwise damage the device or provide false touch-events to be detected), the metallic contacts may be located within one or more recesses in the inner faces of the front and/or rear members 122, 124 of an input module 104.

Although in many examples, electrical energy may be transferred from the charging device 200 to the input modules 104 by the charging mechanism, in other examples, the charging mechanism may transfer power in another form. For example, where an input module 104 comprises a fuel cell, the charging mechanism may be configured (or arranged) to provide hydrogen from the charging device 200 to the input module 104. In such an example, the power input on the charging device 200 may receive hydrogen from an external power source (e.g. from an external supply of hydrogen).

Once the input modules 104 are attached to the charging device 200 (via attachment portions 202), the charging device 200 and input modules 104 form a single composite device 210. This has the effect that a user need only hold one of the input modules 104 or the charging device 200 and the composite device 210 remains intact and moves together as if the modules and charging device were permanently joined together. The single composite device 210 may, in some examples, be a rigid device and in other examples may comprise flexible (e.g. bendable) sections or connections (e.g. between the charging device and an input modules).

In various examples, the single composite device 210 formed from the charging device 200 and one or more input modules 104 may operate as a user input device (e.g. a game controller) for a computing device (e.g. touch-screen computing device 108 or another computing device). The single composite device 210 may communicate via a wired link (e.g. via micro-USB connector 204) or wireless link with the computing device. Where a wired link is used, this may reduce the latency (of input commands via input controls 114 reaching the computing device) and power consumption of the composite device 210.

Figure 3:
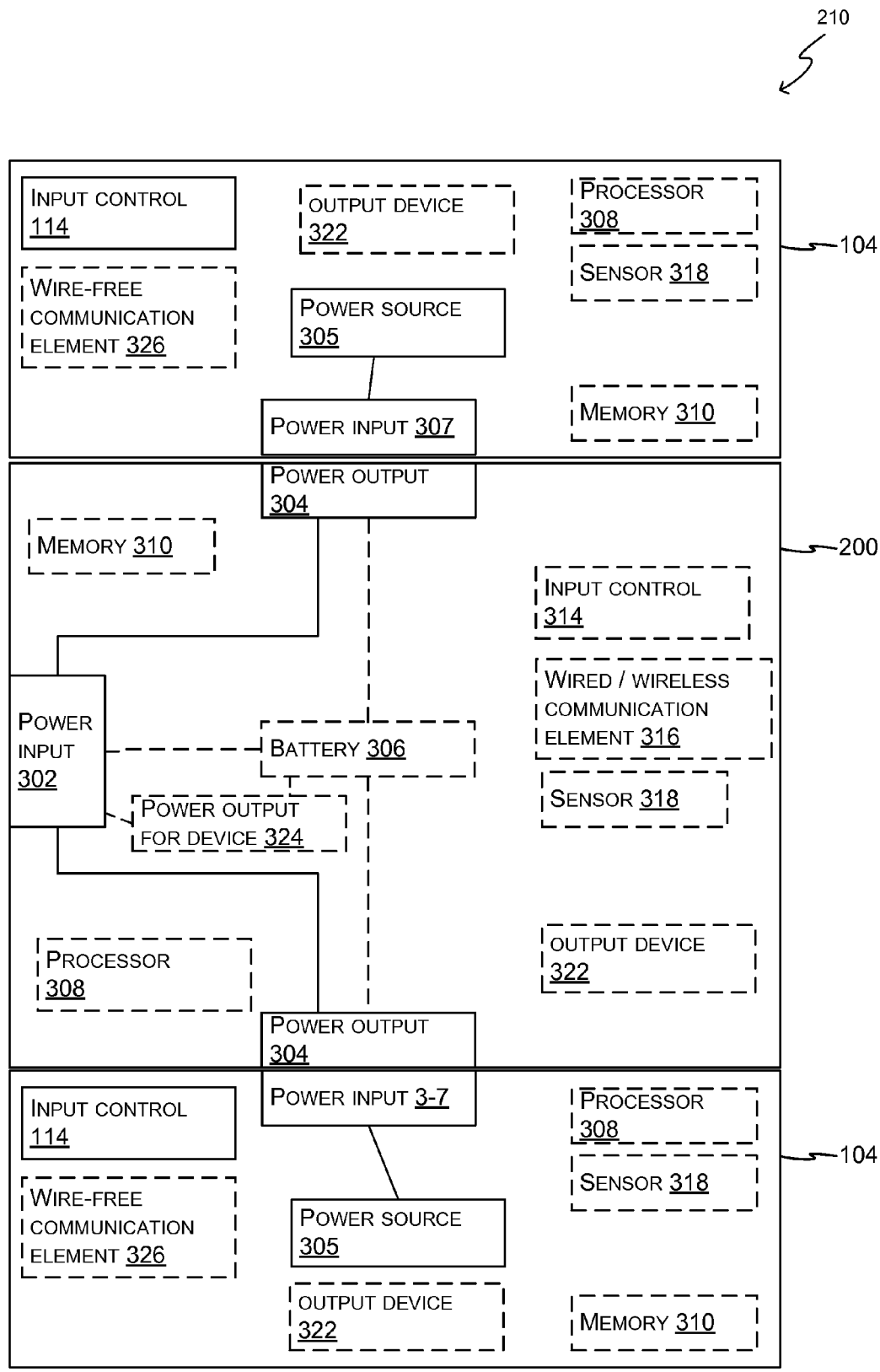
FIG. 3 shows a schematic diagram of another example charging device which is connected to two input modules to form a composite device.

FIG. 3 shows a schematic diagram of another example charging device 200 which is connected to two input modules 104 to form a composite device 210. The charging device 200 comprises a power input 302 which receives power from an external source (e.g. from the mains electricity supply via a wire or using inductive power transfer) and a power output 304 for each input module 104 which can be attached to the charging device 200. The power input 302 and power output(s) 304 may be collectively referred to as the charging mechanism. The charging mechanism may also comprise a battery 306.

In use, the charging device 200 may charge the input modules 104 (e.g. power source 305 within an input module 104) from the external power source and/or the internal battery 306. For example, if the charging device 200 is connected to an external power source (via power input 302), the external power source may be used to charge the internal battery 306 and the internal battery 306 may be used to provide power to the input modules 104 (via the power outputs 304 and power inputs 307) and any other active elements within the charging device (e.g. processor 308, memory 310, input control 314, wired/wireless communication element 316, sensor 318, output device 322, etc.). Alternatively, the external power source may be used to provide power to the input modules 104 (bypassing battery 306) and to charge the internal battery 306, with the internal battery 306 being used to provide power to the input modules only in the absence of an external power source. In other examples, the battery 306 may only ever be used to power active elements within the charging device 200 (e.g. processor 308, memory 310, input control 314, wired/wireless communication element 316, sensor 318, output device 322, etc.) and the power transferred to the input module(s) may only be provided by the external power source (received via power input 302).

As described above, the external power source may provide electrical energy or power in a different form (e.g. in the form of hydrogen or another fuel, or solar radiation, etc.).

The charging device 200 may enable a user to control or configure the charging mechanism, e.g. to determine which particular charging arrangement is used and what happens when the amount of charge in the internal battery 306 starts to run low and there is no external power source available. A battery level indicator (which may be considered an output device 322) may be provided on the charging device 200 to warn the user when the internal battery 306 is running low. In various examples, when the internal battery 306 is running low, the charging device may switch its operation such that it stops charging the input modules 104 and only provides power to the active elements in the charging device. Alternatively, the charging device may switch its operation by disabling all active elements and only charging the input modules 104.

In various examples, the charging mechanism may comprise a further power output 324 which is configured to charge a touch-screen device (e.g. touch-screen device 108). This power output 324 may be configured to enable charging of a touch-screen device in the presence and/or absence of an external power source (via power input 302). In various examples, this additional power output 324 enables the battery 306 to be used to provide additional power to a touch-screen device in the absence of an external power source to power the touch-screen device or the charging device (e.g. when travelling). In various examples, this additional power output 324 enables the touch-screen device and any connected input modules 104 to be charged from a single connection to an external power source (via power input 302). This reduces the number of cables and adapters that a user is required to carry/use.

Figure 4:
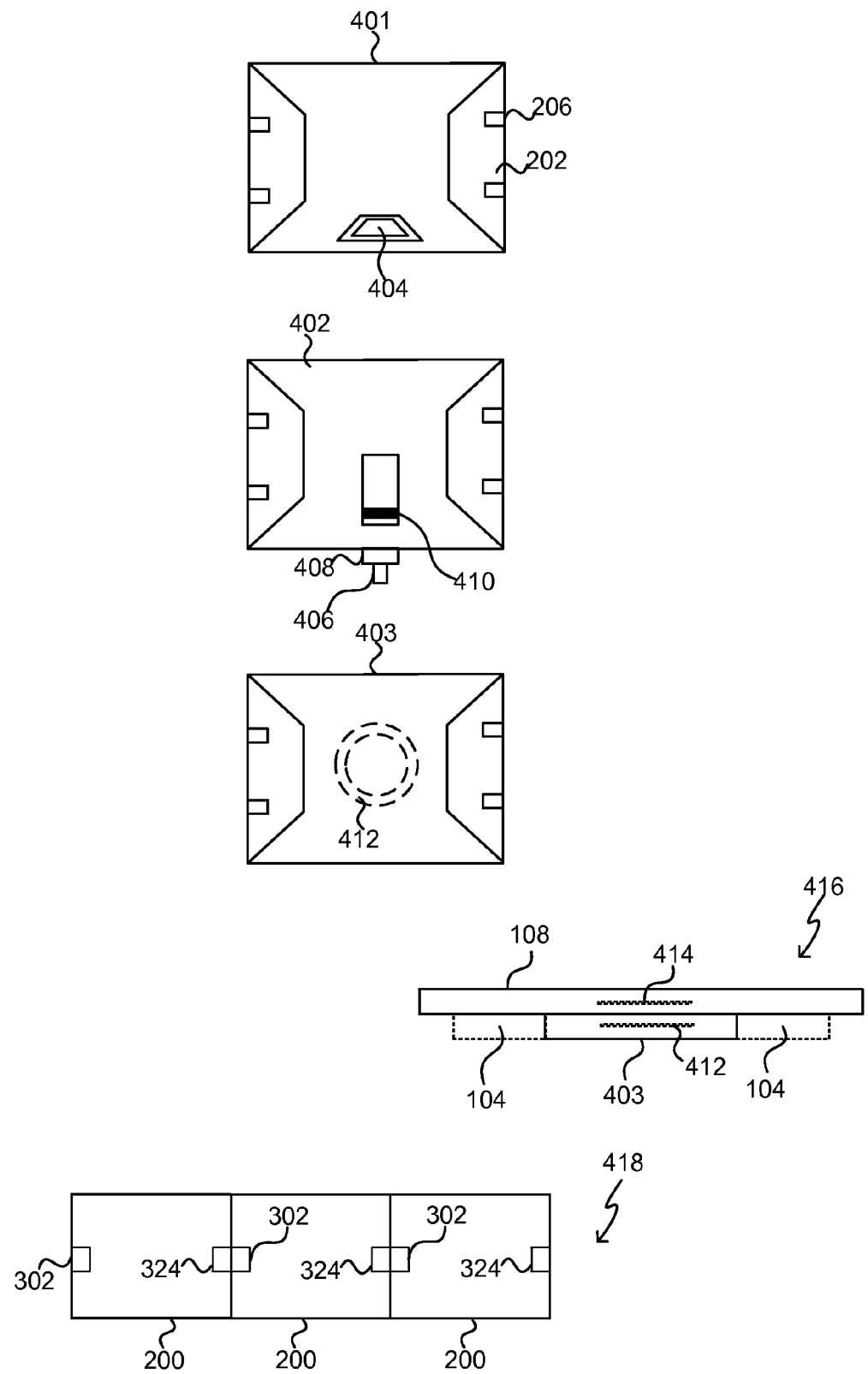
FIG. 4 shows schematic diagrams of an example charging device comprising a power output for a touch-screen device.

The power output for a touch-screen device 324, where provided, may have one of many different forms and may provide wired or wireless charging of the touch-screen device. Three examples 401-403 are shown in FIG. 4. In the first example charging device 401, the additional power output 324 comprises a socket 404 (e.g. a USB or micro-USB socket). Although this socket 404 is shown on the top face of the charging device 401, in other examples it may be on a side face of the charging device. In the second example charging device 402, the additional power output 324 comprises a connector 406 (e.g. a micro-USB connector) on an arm 408 which, when not in use can be retracted within the housing of the charging device 402 but which can be extended such that it protrudes out of the housing (as shown in FIG. 4) by means of a slider 410 or other button/latch. In a variation on the second example, a retractable cable may be instead of the arm 408, with the retractable cable having connector 406 on the distal end. In the third example charging device 403, the additional power output 324 comprises a coil 412. This coil 412 is configured to couple power into a corresponding coil 414 in a touch-screen device 108 and hence to inductively charge a battery in the touch-screen device. As shown in the cross-section view 416, the touch-screen device 108 may be charged by laying the touch-screen device 108 on top of the charging device 403 and charging may be performed when the input modules 104 are attached or are not attached. In this way, the charging device 403 (and/or the composite device formed from the charging device and one or more input modules 104) acts as a wireless charging pad for the touch-screen device 108.

In various examples, the additional power output 324 may in addition, or instead, be used to connect multiple charging devices 200 together (e.g. to daisy-chain the charging devices) as shown in the final schematic diagram 418 in FIG. 4. This is possible irrespective of the particular arrangement used for the additional power output 324 (e.g. it can be used for any of the arrangements shown in the first three examples 401-403 in FIG. 4).

As shown in FIG. 3, a charging device 200 may comprise one or more additional elements, such as a processor 308, memory 310, input control 314, wired/wireless communication element 316, sensor 318, output device 322, etc. Any of these elements which require a power supply (e.g. from battery 306) are collectively referred to herein as 'active elements'. An input control 314 may be provided to enable a user to access the additional power output 324 (e.g. where the input control 314 is slider 410) as described above. An input control 314 may be provided to enable a user to configure/control the charging mechanism (as described above). In addition, or instead, one or more input controls 314 may be provided to supplement the input controls 114 on the input modules 104 when the single composite device 210 formed from the charging device 200 and one or more input modules 104 is used as a game controller. Similarly, one or more sensors 318 and/or output devices 322 may be provided as additional game inputs/outputs when the composite device 210 is used as a game controller. For example, the small size of the input modules 104 may limit the number of input controls 114, sensors 318 and/or output devices which can be provided within an input module and so the composite device 210 may provide a more function-rich user input device for a computing device (e.g. for playing a computer game) than can be provided when using just the input modules 104 (e.g. attached to a touch-screen device as shown in FIG. 1). In other examples, the one or more input controls 314 in the charging device 200 may replicate one or more of the input controls 114 on an input module 104. This may, for example, be used to improve the ergonomics of the composite device (e.g. so that the composite device is more easily held and used).

Figure 5:
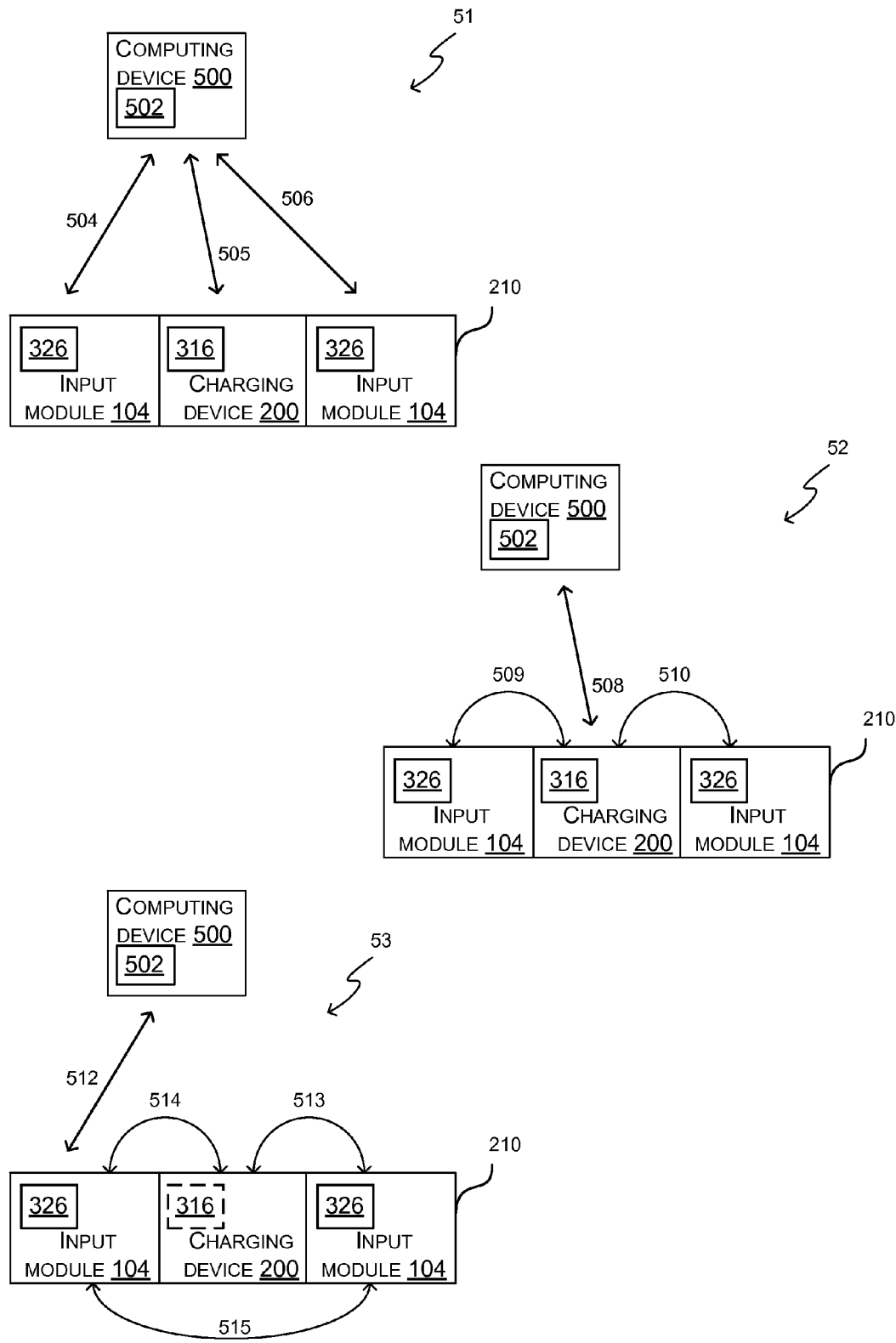
FIG. 5 shows various example communication scenarios between the composite device and a computing device.

When the composite device 210 operates as a user input device (e.g. a games controller) for a computing device 500, there are many different ways that the user inputs which are made on the composite device 210 can be transmitted to the computing device running the software (e.g. computer game) which is being controlled and this can be described with reference to FIG. 5. In the examples described it is assumed that the software is running on a local computing device 500; however, the methods are equally applicable if the software is running on a remote computing device (e.g. remote from the composite device 210) in which case, the graphical user interface may be displayed on the local computing device 500 (which may be a touch-screen computing device) or on a peripheral display connected to the local computing device 500. Additionally, the methods may also be applied where the local computing device 500 with which the composite device 210 communicates acts as a relay and enables the composite device 210 to communicate with a remote computing device which is running the software (e.g. where the local computing device 500 is a wireless access point).

In a first example 51, when connected as composite device 210, each component part (e.g. the input modules 104 and charging device 200) which comprises a user input/output (e.g. any of input controls 114, 314, sensors 318, output devices 322) communicates separately with the computing device 500 (and its input/output interface 502) via their respective communication elements (e.g. wire-free communication elements 326 in the input modules 104 and wired/wireless communication element 316 in the charging device 200), as indicated by arrows 504-506. In this example, if the charging device 200 does not comprise any user inputs/outputs, then it does not communicate with the computing device 500 (i.e. arrow 505 is omitted).

In a second example 52, when connected as composite device 210, only the charging device 200 communicates with the computing device 500 (arrow 508) via its wired/wireless communication element 316. The charging device 200 acts as a relay and forwards on details of user inputs received at an input module 104 to the computing device 500. The communication between an input module 104 and the charging device 200 (arrows 509-510) may be via wire-free communication elements 326 in the input module 104 and the wired/wireless communication element 316 in the charging device 200 or may be via electrical connections (e.g. in the form of additional electrical contacts alongside those used by the charging mechanism). Where a wired data connection (e.g. using additional electrical contacts) is used to communicate between an input module 104 and a charging device 200, the power consumption of the input module 104 is reduced (e.g. because the wire-free communication element 326 can be switched off or placed into a low power mode).

In a third example, 53, when connected as a composite device 210, only one of the input modules 104 communicates with the computing device 500 (arrow 512) via its wire-free communication element 326. This input module 104 acts as a relay and forwards on details of user inputs received at the other input module 104 and/or at the charging device 200. The communication between the two input modules 104 may be via the charging device 200 (arrows 513-514) using wired/wireless technology (e.g. using elements 316, 326 or additional electrical contacts) or directly (arrow 515) using the wire-free communication elements 326 in both input modules 104. Where a wired connection (e.g. using additional electrical contacts) is used to communicate between the two input module 104s via the charging device 200, the power consumption of one of the input modules 104 is reduced (e.g. because its wire-free communication element 326 can be switched off or placed into a low power mode). Where this third example is used, the charging device 200 may not comprise a wired/wireless communication element (e.g. element 316 omitted).

Where the second example 52 is used, an input module 104 changes its mode of operation when it is attached to the charging device 200 i.e. such that it communicates with the computing device via the charging device 200 and not directly as would be the case when operating separately from the charging device 200. This is in contrast to the first example 51 where each continues to communicate independently irrespective of whether they are separate or part of the composite device 210. Where the third example 53 is used, the input modules 104 may change their mode of operation when attached to the charging device 200 (i.e. such that one relays all the user input data to the computing device 500); however, in various examples, the input modules may operate in this way irrespective of whether they are separate or part of the composite device 210.

It will be appreciated that the lines of communication (indicated by arrows 504-506, 508-510 and 512-515 in FIG. 5) may be used both to provide user input data to the computing device 500 from the charging device 200 and/or input modules 104 (e.g. as generated by input controls 114, 314 and/or any sensors 318) and to provide output data to the charging device 200 and/or input modules 104. Any output data received may, for example, be used to control any output devices 322 in the input modules 104 and charging device 120.

Examples of output devices 322 include, but are not limited to, visual indicators (e.g. a small display, one or more LEDs, a region of electronic paper) and audible indicators (e.g. a small speaker or buzzer or headphone socket). In examples where the charging device 200 comprises a visual indicator this may be used to display a 'badge of honor' or other achievement indicator which corresponds to the user's gameplay and which may be a persistent trace of a user's achievement. For example, the visual indicator may display something which represents a user's skill level, level of achievement in a particular game, etc. and which can be seen by other people in proximity to the charging device 200. The visual indicator may be based on data stored within the charging device 200 (e.g. in memory 210) as described below. In other examples, the visual indicator may display status information for the charging device or an input module (e.g. battery level, whether it is charging or not, etc.).

In various examples, the operation of an output device 322 on an input module 104 may be modified dependent upon whether the input module 104 is connected to the charging device 200 or not. For example, where the output device 322 comprises a visual indicator (e.g. one or more LEDs or a small display), the brightness of the visual indicator may be reduced when the input module 104 is not connected to the charging device 200 (e.g. because it may be assumed that the input module 104 is then attached to a touch-screen device and so is close to the display screen) but can be increased when the input module 104 is attached to the charging device 200 (e.g. because it may be assumed that the visual indicator is now further from the display and is less likely to be distracting to the user).

Further examples of output devices include feedback devices such as tactile (or haptic) feedback devices (e.g. a vibration mechanism, any physical movement actuator or a movement retarder if the touch-screen device or module is flexible or articulatable) and other sensory feedback devices (e.g. a heating/cooling device, such as a Peltier cooler, which can provide feedback by changing the temperature of a module or chemical outputs for smells, hormones, etc.).

Examples of input controls 114, 314 include, but are not limited to, directional controls (e.g. D-pads or four-way controls), rotary knobs, sliders, buttons (e.g. one or more buttons), switches and small joysticks. These input controls may be provided on any of the faces of the charging device.

Examples of sensors 318 include, but are not limited to, hover sensors for hand position (e.g. based on reflecting IR or seeing IR shadows, thermal IR sensing, capacitive sensing or based on ultrasound), accelerometers, motion detectors, magnetometers for sensing distortions due to rings worn on hands, and any other types of sensor that can detect a characteristic of the human (e.g. galvanic skin response sensors or heart rate sensors) or a characteristic of something the human is wearing.

The input control 314 and/or sensors 318 may comprise Natural User Interface (NUI) technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

As also shown in FIG. 3, the charging device 200 may comprise one or more processors 308. The processors 308 may be microprocessors, controllers or any other suitable type of processor for processing computer executable instructions to control the operation of the charging device. As described above, the processor 308 may control the charging and/or communication configuration used. Furthermore, the processor 308 may control the operation of the active elements 314-322 in the charging device 200. In some examples, for example where a system on a chip architecture is used, the processor 308 may include one or more fixed function blocks (also referred to as accelerators) which implement a part of the method of operating the charging device in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The computer executable instructions executed by the processor 308 may be provided using any computer-readable media that is accessible by the charging device 200. Computer-readable media may include, for example, computer storage media such as memory 310 and communications media. Computer storage media, such as memory 310, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media.

In addition to, or instead of, storing computer executable instructions executed by a processor 308, a memory 310 within a charging device 200 may be used to store user data and/or game data. In various examples, a memory 310 within a charging device 200 may store game data for a user (e.g. details of their skill level, achievements, avatars, etc.) and this data may be transmitted to (or synchronized with) a computer game before, during and/or after game play via the communication element 316.

The communication element 316 in the charging device (where provided) may be used to communicate with a computing device 500 and/or an input module 104 as described above with reference to FIG. 5. Any suitable wired or wireless technology may be used, for example, Bluetooth®, Bluetooth® Smart (also known as BLE), Wi-Fi™, infra-red, USB, Ethernet, cellular wireless technologies (e.g. 2G, 3G, GSM, etc.) or a proprietary protocol/technology. In addition to, or instead of, communicating input control data (as described above with reference to FIG. 5), the communication module 316 may be used (e.g. under the control of processor 308) to link an input module to a touch-screen device.

As described above, when not connected to the charging device 200, an input module 104 may be removably attached to a touch-screen device with input controls on the input module being mapped to user inputs in software displayed on the touch-screen device. As part of this mapping (e.g. to enable the input module to communicate with the touch-screen device) the input module may be linked to the touch-screen device. In order to link an input module to the touch-screen device, the input module may provide a wireless identifier (e.g. Bluetooth® ID) or other identifier (e.g. a globally unique identifier, which may, for example, be fixed at the time of manufacture) to the touch-screen device. In various examples, the communication element 316 in a charging device 200 may be configured to transmit the identifier for a connected input module to a computing device (e.g. a touch-screen computing device).

In other examples, the communication element 316 may not be used to assist in the linking but instead the charging device may comprise a writable (or re-writable) NFC tag which is used to transmit the identifier. In such an example, the charging device 200 receives the identifiers from the attached input modules (e.g. via communication element 316 or electrical data contacts in the attachment portion 202) and the processor 308 may write the identifiers for the attached input modules to the writable NFC chip. The identifiers for the input modules can then be communicated to the touch-screen device via a NFC reader in the touch-screen device. This provides an efficient linking mechanism—a user connects the input modules to a charging device and then places their NFC enabled touch-screen device on or close to the charging device. The touch-screen device then reads the identifiers for the input devices from the writable NFC tag in the charging device.

In other examples, a different communication mechanism may be used between the charging device and the touch-screen device such as a LED in the charging device. The LED (which may be in the visible or infra-red spectrums) may signal (via a series of flashes) the identifiers for the input modules. The signal from the LED may be detected via a camera in the touch-screen device. Similarly, where the charging device comprises a display, the identifiers may be communicated to the touch-screen device by displaying a code (e.g. a barcode or QR code) on the display which encodes the identifier(s) and then this displayed code can be captured by a camera in the touch-screen device and decoded in the touch-screen device.

In examples where electrical data connections are provided between the charging device and input modules (e.g. via electrical contacts in the attachment portions 202), these connections may enable the processor 308 in the charging device (and/or an input control 314) to control the operation of an input module. For example, a single on/off switch in the charging device may be used to control the entire composite device 210. In various examples, the processor 308 may cause the wire-free communication element 326 in an input module 104 to be powered down (or placed in a low power mode) when using a particular communication configuration (e.g. as in examples 52 and 53 in FIG. 5).

As described above, the single composite device 210 formed from the charging device 200 and one or more input modules 104 attached to the charging device 100 may operate as a user input device for a computing device where this computing device may be a touch-screen computing device (and to which the input modules could separately be attached) or a non-touch-screen computing device (e.g. a games console or desktop computer). The single composite device 210 described above is typically smaller than conventional games controllers (because of the small form factor of the individual input modules 104) and this may make it very suited to users with small hands (e.g. children).

Figure 6:
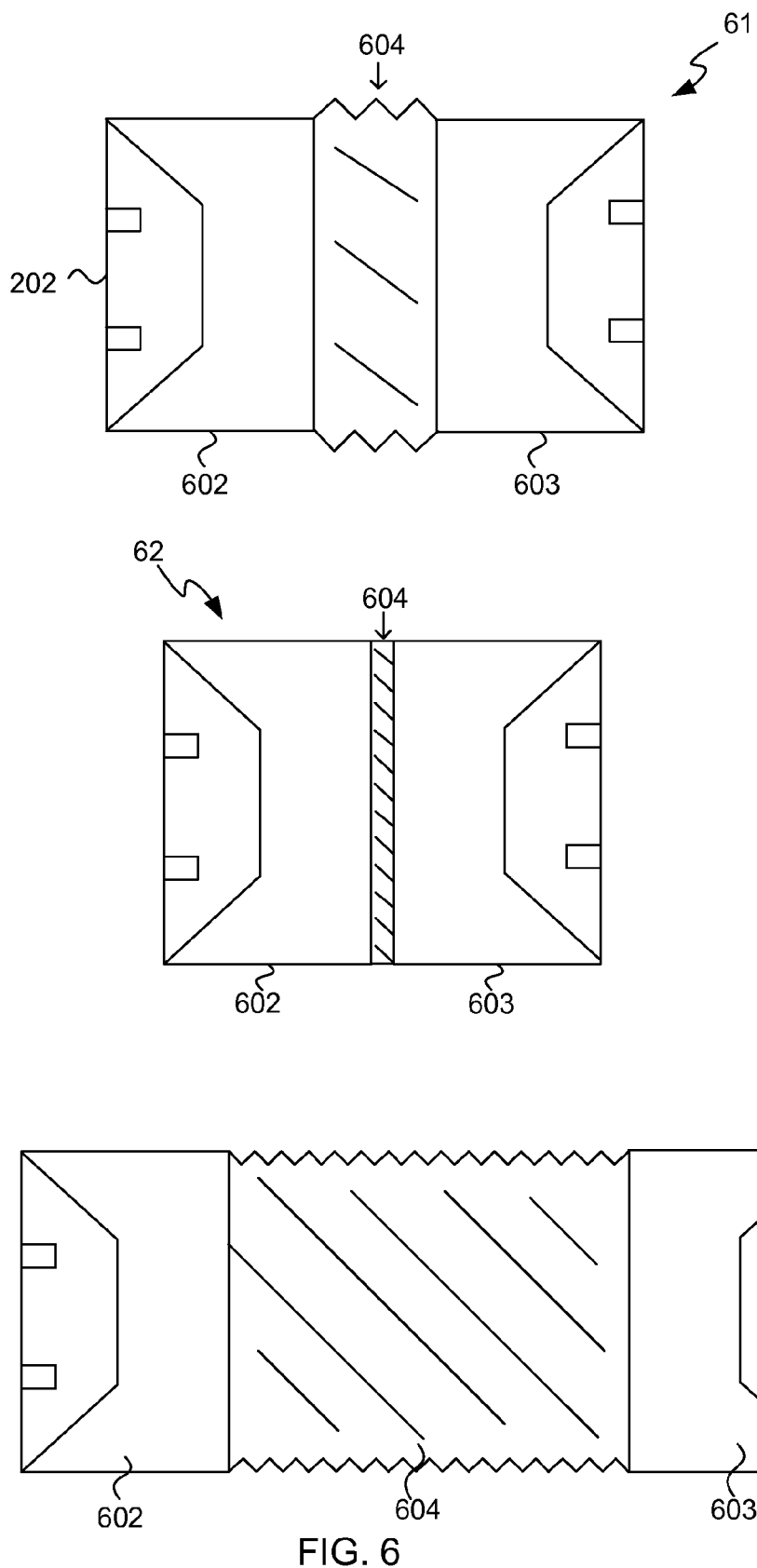
FIG. 6 shows schematic diagrams of a further example charging device which is formed from two parts either side of an adjustable region.

FIG. 6 shows schematic diagrams of a further example charging device which is formed from two parts 602, 603 either side of an adjustable region 604 (which may be an adjustable center region as shown in FIG. 6). As shown in the three views 61-63 in FIG. 6, by compressing or extending the adjustable region 604 the size (e.g. width) of the charging device can be varied and this in turn varies the size (e.g. width) of the single composite device which is formed when one or more input modules are attached to the attachment portions 202. As a result, the size of the single composite device can be varied to suit users with different sizes of hands whilst still being able to have a compact form factor (e.g. as shown in the second view 62) when being stored or being used only to charge the input modules and not as a user input device.

The adjustable region 604 may be implemented in any way and examples include using telescopic rods (where when shortened, the segments of rods slide inside each other), a scissor mechanism, a bendable tube region (similar to a bendable drinking straw), etc. In various examples the adjustable region 604 may allow articulation in a single axis (e.g. as depicted in FIG. 6) or may allow articulation in more than one axis.

The use of an adjustable region 604 as shown in FIG. 6 is one example way in which the charging device described herein can be modified to make the single composite device (formed from the charging device and one or more attached input modules) a more ergonomic user input device. A further example is shown in FIG. 7 and although the example charging device 700 shown in FIG. 7 does not comprise an adjustable region, it will be appreciated that in a yet further example, the charging device 700 shown in FIG. 7 may be modified to include an adjustable region.

Figure 7:
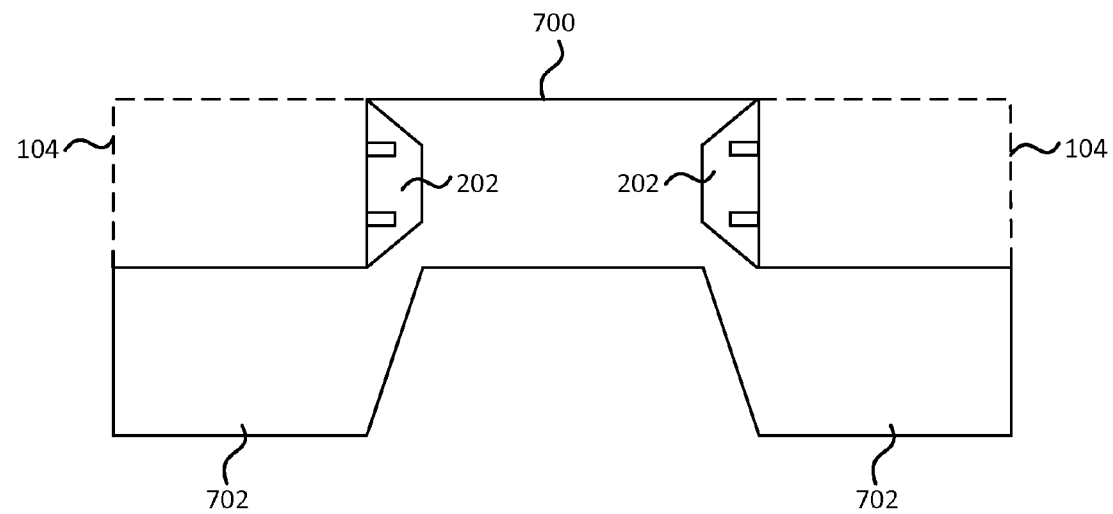
FIG. 7 is a schematic diagram of another example charging device.

The example charging device 700 shown in FIG. 7 comprises two attachment portions 202 and two grip portions 702. Although no input controls are shown in FIG. 7, it will be appreciated that, as described above, the charging device 700 may comprise input controls, sensors, output devices, etc. For example, a grip portion 702 may comprise input controls, sensors, output devices, etc.

In a variation on the example shown in FIG. 7, the grip portions 702 may be removable such that the charging device comprises one or more attachment portions 202, each of which is configured to receive an input module 104 and one or more connecting features configured to receive an extension portion, such as a grip portion 702. In an example, the connecting feature may comprise a groove or recess which is shaped to receive a corresponding protrusion on the grip portion (e.g. such that the grip portion can be slid or slotted into the charging device). Use of removable extension portions increases the ability to customize the charging device to improve the ergonomics of the single composite device (formed from the charging device, one or more input modules and one or more extension portions) for a particular user (e.g. based on hand size, grip, preferred locations of input controls, etc.). Different users may select and attach different extension portions. In various examples an extension portion may comprise an additional battery which supplements battery 306 in the charging device (or provides a battery where no battery is provided within the charging device itself). A battery in such an extension portion may be charged via power input 302 in the charging device and electrical connections between the charging device and the extension portion.

Figure 8:
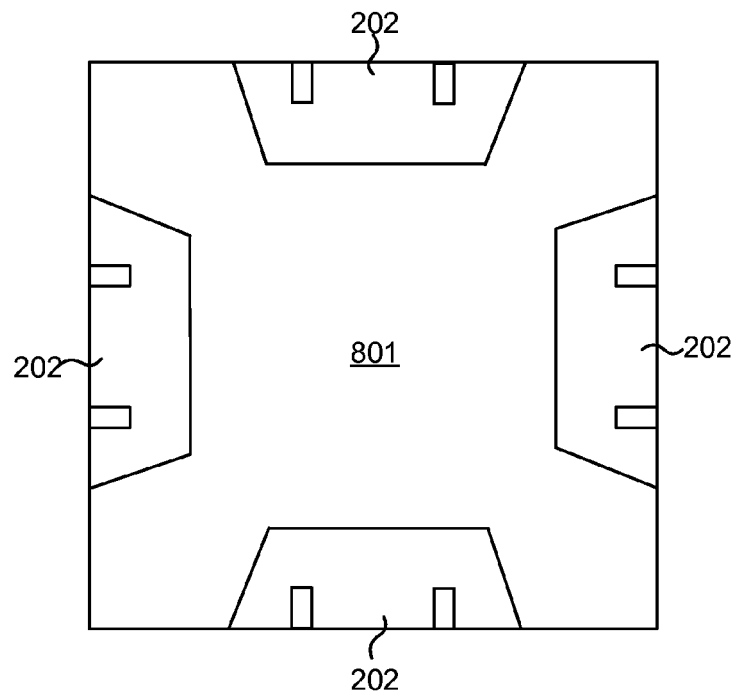
FIG. 8 shows schematic diagrams of two further example charging devices.
Figure 8:
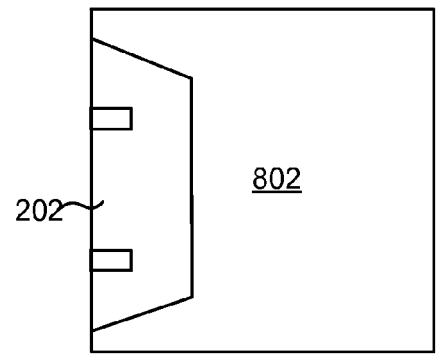

The example charging devices shown in FIGS. 2-7 each comprise two attachment portions 202 and so can receive a maximum of two input modules. In other examples, a charging device may comprise a different number of attachment portions, e.g. a single attachment portion or more than two attachment portions. FIG. 8 shows two further example charging devices: the first charging device 801 comprises four attachment portions 202 and so can receive a maximum of four input modules and the second charging device 802 comprises a single attachment portion 202 and so can receive a maximum of one input module.

In the examples shown in FIGS. 2-8 and described above, the input modules 104 attach to the example charging devices (and attachment portions 202) in the same way as they attach to a touch-screen device. In other examples, however, the input modules 104 may comprise a first attachment mechanism for attaching to a touch-screen device and a second attachment mechanism for attaching to an attachment portion of a charging device as described herein. Consequently, the attachment portion 202 of a charging device may have any shape and configuration which is adapted to receive an input module such that once attached they form a single composite device. The input module can be detached from the charging device; however, once attached it connects sufficiently firmly that it does not fall off if (a) a user picks up the charging device without touching (or supporting) the input module or (b) a user picks up the input module without touching (or supporting) the charging device.

Depending on the particular configuration of the attachment portion, an input module may need to be connected in a particular orientation in order that it can charge from the charging device (and transmit data, where electrical data connections are provided/used). In such examples, the attachment portion or the charging device may comprise protrusions or other physical features which prevent the input module from being attached securely in an incorrect orientation. For example, where the charging device comprises two attachment modules and is configured to receive two different input modules (e.g. as shown in FIG. 2), the charging device 200 may comprise physical features which ensure that the left input module (comprising the D-pad) can only attach to the left attachment mechanism (when viewed in the orientation as shown in FIG. 2) and the right input module (comprising the XYAB buttons) can only attach to the right attachment mechanism. In such an example, the charging device may be described as being 'keyed' to ensure that the input modules can only be attached in the correct orientation and/or to a particular attachment portion.

In various examples, the charging device described herein may further comprise a mechanism for attaching it to the rear face of a touch-screen device (e.g. using suction-cup tape), to a user (e.g. in the form of a belt clip) or to another object (e.g. a door frame/handle). Where the charging device comprises a mechanism for attaching it to a user or other object, it may additionally operate as a user input device for a computing device when input modules are not attached to it (e.g. using any input controls and/or sensors in the charging device). For example, it may collect data about a user's activity (e.g. using sensors 318) when attached to a user and this activity data may be input to the software. In another example, it may act as a motion detector for an object to which it is attached (e.g. to detect when a door is opened).

Although many of the present examples are described and illustrated herein as being implemented in a system comprising a touch-screen device, the system described is provided as an example and not a limitation. As those skilled in the art will appreciate, the present examples are suitable for application in a variety of different types of systems and although the input modules can be attached to a touch-screen device and provide inputs to the touch-screen device, when attached to the charging device they may provide user inputs to a different computing device. Furthermore, although the charging devices are shown as being flat, substantially planar devices, the charging devices described herein may also be curved (e.g. to further improve the ergonomics of the composite device).

A first further example provides a charging device for one or more removable input modules for a touch-screen device, the charging device comprising: a charging mechanism comprising a power input to receive power from an external power source and a power output to provide power to one or more removable input modules; and one or more attachment portions, each attachment portion shaped to receive an input module to form a single composite device.

A second further example provides a charging device for one or more removable input modules for a touch-screen device, the charging device comprising: means for providing power to one or more removable input modules; and means for attaching an input module to the charging device to form a single composite device.

In any of the examples described above (including the first and second further examples), the single composite device may operate as a user input device for a computing device.

In any of the examples described above (including the first and second further examples), the charging device may further comprise one or more input controls.

In any of the examples described above (including the first and second further examples), the charging device may further comprise one or more output devices.

In any of the examples described above (including the first and second further examples), the charging device may further comprise one or more sensors.

In any of the examples described above (including the first and second further examples), the charging device may further comprise a communication element configured to receive commands from the computing device; and a processor configured to control an output device, input control or sensor responsive to commands received from the computing device.

In any of the examples described above (including the first and second further examples), the charging device may further comprise a communication element configured to communicate user input data to the computing device, the user input data being generated in response to user input via one or more input controls on the single composite device.

In any of the examples described above (including the first and second further examples), the charging device may further comprise a memory configured to store user data and a communication element configured to communicate the user data to the computing device directly or via an input module.

In any of the examples described above (including the first and second further examples), the charging mechanism may further comprise a battery and wherein the power input is electrically connected to the battery to enable the battery to be charged when the power input is receiving power from the external power source.

In any of the examples described above (including the first and second further examples), the charging mechanism may further comprise a power output to provide power to a touch-screen device. In various examples, the power output to provide power to a touch-screen device is connected to the battery to enable the battery to provide power to the touch-screen device when the power input is not receiving power from the external power source. In various examples, the power output to provide power to a touch-screen device comprises a coil to inductively charging the touch-screen device.

In various examples, the power output to provide power to one or more removable input modules comprises a plurality of electrical contacts on each attachment portion and an attachment portion further comprises one or more electrical contacts for data communication between the charging device and an input module.

In any of the examples described above (including the first and second further examples), the charging device may further comprise a first part comprising an attachment portion, a second part comprising an attachment portion and an adjustable region configured to enable adjustment of a width of the single composite device.

In any of the examples described above (including the first and second further examples), the charging device may further comprise a processor configured to control operation of an input module via the one or more electrical contacts for data communication.

In any of the examples described above (including the first and second further examples), the charging device may further comprise a writable NFC tag and a processor, wherein the processor is configured, in response to receiving an identifier from an input module, to store the identifier in the writable NFC tag.

A third further example provides a user input device for a computing device comprising: a charging device according any of the examples described above (including the first and second further examples); and a plurality of input modules comprising at least one input control and an attachment mechanism to connect to a touch-screen device and to the charging device.

At least one of an input module and the charging device in the third further example may comprise: a wireless communication element configured to communicate user input data to the computing device, the user input data being generated in response to user input via input controls on the user input device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. Propagated signals may be present in a tangible storage media (e.g. they may be stored in a tangible storage media or used in the storage process), but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A charging device for one or more removable input modules for a touch-screen device, the charging device comprising:
    a charging mechanism comprising a power input to receive power from an external power source and a power output to provide power to one or more removable input modules, the one or more removable input modules configured to be removably attachable to the touch-screen device and to the charging device; and
    one or more attachment portions, each attachment portion shaped to receive a corresponding removable input module of the one or more removable input modules to form a single composite device, the single composite device separate from the touch-screen device.

2. The charging device according to claim 1, wherein the single composite device operates as a user input device for a computing device.

3. The charging device according to claim 2, further comprising one or more input controls, output devices and/or sensors.

4. The charging device according to claim 3, further comprising:
    a communication element configured to receive commands from the computing device; and
    a processor configured to control an output device, input control or sensor responsive to commands received from the computing device.

5. The charging device according to claim 2, further comprising a communication element configured to communicate user input data to the computing device, the user input data being generated in response to user input via input controls on the single composite device.

6. The charging device according to claim 2, further comprising a memory configured to store user data and a communication element configured to communicate the user data to the computing device directly or via the one or more removable input modules.

7. The charging device according to claim 1, wherein the charging mechanism further comprises a battery and wherein the power input is electrically connected to the battery to enable the battery to be charged when the power input is receiving power from the external power source.

8. The charging device according to claim 1, wherein the charging mechanism further comprises a power output to provide power to a touch-screen device.

9. The charging device according to claim 8, wherein the power output to provide power to the touch-screen device is connected to the battery to enable the battery to provide power to the touch-screen device when the power input is not receiving power from the external power source.

10. The charging device according to claim 8, wherein the power output to provide power to the touch-screen device comprises a coil to inductively charging the touch-screen device.

11. The charging device according to claim 1, wherein the power output to provide power to the one or more removable input modules comprises a plurality of electrical contacts on each attachment portion, each attachment portion further comprising one or more electrical contacts for data communication between the charging device and one of the one or more removable input modules.

12. The charging device according to claim 1, further comprising a first part comprising an attachment portion, a second part comprising an attachment portion and an adjustable region configured to enable adjustment of a width of the single composite device.

13. The charging device according to claim 12, further comprising a processor configured to control operation of an input module via the one or more electrical contacts for data communication.

14. The charging device according to claim 1, further comprising a writable NFC tag and a processor, wherein the processor is configured, in response to receiving an identifier from one of the one or more removable input modules, to store the identifier in the writable NFC tag.

15. A user input device for a computing device comprising:
- a charging device; and
- a plurality of input modules, each of the plurality of input modules comprising at least one input control and an attachment mechanism to be removably attachable to a touch-screen device and to the charging device,
- wherein the charging device comprises:
    - a charging mechanism comprising a power input to receive power from an external power source and a power output to provide power to the plurality of input modules; and
    - a plurality of attachment portions, each attachment portion shaped to receive a corresponding one of the plurality of input modules to form a single composite device separate from the touch-screen device.

16. The user input device according to claim 15, wherein at least one of the plurality of input modules and the charging device comprises:
- a wireless communication element configured to communicate user input data to the computing device, the user input data being generated in response to user input via input controls on the user input device.

17. The user input device according to claim 15, wherein the charging device further comprises at least one of an input control, a sensor or an output device.

18. The user input device according to claim 15, wherein the charging mechanism further comprises a power output to provide power to a touch-screen device, wherein the power output to provide power to a touch-screen device is connected to the battery to enable the battery to provide power to the touch-screen device when the power input is not receiving power from the external power source.

19. The user input device according to claim 15, further comprising adjusting mechanism to adjust a shape of the user input device, the adjusting mechanism comprising:
- an adjustable region of the charging device configured to enable adjustment of a width of the user input device; and/or
- one or more removable extension pieces.

20. A charging device for one or more removable input modules for a touch-screen device, the charging device comprising:
- a power input to receive power from an external power source;
- a power output to provide power to one or more removable input modules, each of the one or more removable input modules being removably attachable to a touch screen-device and the charging device;
- a battery;
- a power output to provide power to a touch-screen device, wherein the power output to provide power to the touch-screen device is connected to the battery to enable the battery to provide power to the touch-screen device when the power input is not receiving power from the external power source; and
- one or more attachment portions, each attachment portion shaped to receive corresponding one of the one or more removable input modules,
- wherein the charging device is capable of being configured as a single composite input device separate from the touch-screen device.

* * * * *